United States Patent [19]

Breault et al.

[11] Patent Number: 4,858,789

[45] Date of Patent: Aug. 22, 1989

[54] SEALLESS MODULAR POSITIVE DISPLACEMENT DISPENSER

[75] Inventors: John P. Breault, New Britain; Ewald F. Dickau, Glastonbury, both of Conn.

[73] Assignee: Loctite Corporation, Newington, Conn.

[21] Appl. No.: 176,875

[22] Filed: Apr. 4, 1988

[51] Int. Cl.$^4$ ........................ G01F 11/06; G01F 11/30

[52] U.S. Cl. ........................................ 222/309; 222/559

[58] Field of Search ............... 222/491, 559, 495, 496, 222/309, 380, 372, 504, 334, 567; 92/104, 96; 403/362; 239/373

[56] References Cited

U.S. PATENT DOCUMENTS

| | | | |
|---|---|---|---|
| 2,111,168 | 3/1938 | Chansor | 92/104 |
| 3,022,955 | 2/1962 | Riddell | 239/373 |
| 3,327,900 | 6/1967 | Goda | 222/309 |
| 3,355,112 | 11/1967 | Shaffer et al. | 222/504 |
| 3,463,363 | 8/1969 | Zelna | 222/504 |
| 4,347,806 | 9/1982 | Argazzi | 118/710 |
| 4,353,325 | 10/1982 | Argazzi | 118/683 |
| 4,456,152 | 6/1984 | Young et al. | 222/309 |
| 4,756,639 | 7/1988 | Hoshino | 403/362 |

FOREIGN PATENT DOCUMENTS

| | | | |
|---|---|---|---|
| 2104977 | 3/1983 | United Kingdom | 222/372 |

OTHER PUBLICATIONS

"Operating Instructions—725 D Diaphragm Valve", 16 pages copyrighted 1983 by Electron Fusion Devices, Inc.

*Primary Examiner*—Andres Kashnikow
*Assistant Examiner*—Mark T. Le
*Attorney, Agent, or Firm*—Perman & Green

[57] ABSTRACT

Modular positive displacement apparatus for dispensing precise quantities of a fluid product including a dispensing unit and an actuator unit. A housing of the dispensing unit defines a reservoir which contains the product under pressure. Within the housing is a ball-type closure mechanism. A deformable diaphragm isolates the reservoir from the mechanism which actuates the valve to prevent undesirable entry of the product. The diaphragm may be of a number of shapes, depending upon the length of the stroke desired for the ball mechanism. The dispensing unit is readily removable from the actuator unit and can be readily replaced with another dispensing unit. Different nozzle sizes can also be accommodated. The extent of the closure opening is adjustable in discrete increments.

32 Claims, 6 Drawing Sheets

SEALLESS MODULAR POSITIVE DISPLACEMENT DISPENSER

BACKGROUND OF THE INVENTION

I. Field of the Invention

The present invention relates generally to fluid dispensing mechanisms and, more particularly, to an improved modular positive displacement dispenser system of simplified construction in which the dispenser module does not require seals, particularly sliding seals, for its operation, yet applies precisely controlled quantities of the fluid to a receiving surface Sealants and adhesives, especially of the high viscosity type, are oftentimes difficult to dispense in an accurate and controlled manner. Excessive amounts are wasteful and give a sloppy appearance while insufficient amounts could affect the sealing quality. Moreover, the dispensing should be carried out quickly without compromising on accuracy.

II. Description of the Prior Art

There are a number of known designs for dispensing fluids such as adhesives, sealants, and the like, at accurately controlled flow rates, in accurate quantities, and for accurate placement on a receiving surface.

The commonly assigned U.S. Pat. No. 4,347,806 to Argazzi et al issued Sept. 7, 1982 and entitled "Liquid Dispensing Apparatus" discloses a positive displacement type of valve in which a quantity of the fluid is admitted into a chamber whereupon a piston then forces that quantity out through the dispensing outlet or nozzle. In this instance, and in other known instances of the prior art, seals are necessary components of the mechanism and are not totally effective in satisfying their intended purpose.

It is noteworthy that loss of the fluid that does not issue from the outlet nozzle but finds its way instead into other cavities of the dispensing mechanism is a primary concern. In particular, when the fluid is a sealant or adhesive material, it subsequently accumulates, then hardens, and thereby has a detrimental effect on the operation of the dispensing mechanism, even to the point of rendering it inoperative.

A significant improvement in the state of the art occurred with the invention disclosed in the co-pending and commonly assigned application of E. Dickau, entitled "Sealless Dispensing Mechanism", Ser. No. 57,614 filed June 3, 1987 which is hereby incorporated by reference in its entirety. While not a positive displacement pump, that invention relates to a simplified fluid dispenser for dispensing precise quantities of fluid without requiring special seals or springs. It comprises a housing defining a fluid reservoir having an inlet for delivery of pressurized fluid to the reservoir, and including a valve seat defining an outlet for dispensing fluid from the reservoir. A deformable actuator mechanism overlies an open end of the housing opposite the outlet and normally biases a valve engageable with the valve seat to the closed position. When selectively deformed, the actuator is effective to move the valve to the open position to dispense a quantity of the fluid from the reservoir. When released, the actuator returns to its normal condition, returning the valve to the closed position. It is able to dispense fluids having an extremely broad range of viscosities, namely, from one centipoise to a value substantially in excess of one million centipoises.

Furthermore, the dispenser of that invention can be turned on and off instantaneously, that is, starting and stopping a flow of fluid occurs at substantially the same time as operation of the valve actuator. Another significant feature of that invention resides in its construction and manner of operation according to which movement of an actuator used to operate the dispenser causes simultaneous and equal movement of the valve off its seat for dispensing the fluid. This feature allows the dispenser to operate at very high actuation speeds. In actual fact, the dispensing of the fluid is substantially simultaneous with the actuation of the valve.

The contruction disclosed in the aforesaid patent application utilizes no internal seals, especially sliding seals which are particularly susceptible to wear. As a result, the operation of that invention is not hindered by seals which are particularly susceptible to becoming inoperative by being caked or gummed up with dried or partially dried sealant or adhesive material which are commonly dispensed products.

SUMMARY OF THE INVENTION

The present invention incorporates the features of the superior dispensing mechanism just described into a positive displacement pump and results from continued development of the concepts disclosed in that aforesaid patent application. To this end, a modular positive displacement apparatus for dispensing precise quantities of a fluid product is disclosed which includes a dispensing unit and an actuator unit. A housing of the dispensing unit defines a reservoir which contains the product under pressure. Within the housing is a ball-type closure mechanism which is actuated by a charge or predetermined quantity of the product itself. A deformable diaphragm isolates the reservoir from the mechanism which actuates the closure to prevent undesirable entry of the product.

A primary feature of the present invention resides in its modular design according to which a self contained actuating unit can be joined with a dispensing unit by way of a quick disconnect construction. According to the invention, both the actuating unit and the dispensing unit may be constructed in a variety of sizes, each size of an actuating unit being interchargeable with each size of a dispensing unit. A quick disconnect locking mechanism is utilized according to which any actuating unit can be rapidly and easily connected to, or disconnected from, an associated dispensing unit. In the same manner, any one of a variety of sizes of dispensing nozzles can also be attached to any of the dispensing units.

In the present invention, a diaphragm, which may be any one of a variety of shapes and constructions, serves to separate the actuating unit from the dispensing unit when the two are joined together. The diaphragm replaces dynamic or shaft seals which were utilized in dispensers known to the prior art. Since the diaphragm does not slide, its operation does not create heat which would have the effect of undesirably promoting curing in the instance in which the product being dispensed is a heat curable sealant or adhesive. Also, because there is no sliding action, wear is minimized and frictional losses can be disconnected.

The dispenser of the invention is able to dispense fluid products of a broad range of viscosities, from at least one to at least one million centipoises. This ability is achieved by means of a curing resistant design according to which the fluid reservoir has a relatively large diameter while the stem for actuating the closure has a relatively small diameter. Additionally, the preferable use of a spherical closure, or check ball, in combination with a conical seat results in a line, rather than area, contact between the closure elements, thereby effectively guarding against bonding of the mating surfaces and undesirably causing the closure to be sealed in the closed position.

Another feature of the invention resides in its ability to accurately dispense discrete quantities of a fluid product enabling its used for statistical process control applications.

A particularly noteworthy feature of the invention resides in the stroke adjustment mechanism which enables the operator, with the turn of a dial which is operable in a series of discrete increments, to either increase or decrease the amount of product being dispensed at each stroke. This stroke adjustment capability which simultaneously serves to adjust the frequency of operation of the dispensing unit, together with the feature of instantaneous operation which was previously mentioned, make the dispenser of the invention particularly attractive for use in robotized machinery. Such applications also benefit from the feature of modularity by which different size combinations of components, namely, actuating units, dispensing units, and dispensing needles can be utilized, then easily and rapidly changed, as desired.

The invention thereby enables the use of a closure mechanism which is tailored to a specific application or for the dispensing of a particular fluid product. For example, in a high speed operation which generates significant amounts of heat, or in a high temperature environment, it may be desirable to use ceramics or other materials which have a superior heat absorption capability. On the other hand, inexpensive plastic materials can be used for dispensing fluid products which have a very slow reaction time or which are substantially non reactive. Metals such as 316 stainless steel may be selected for certain fluid products which are low or moderately active where the use is in a medical, explosive, or clean-room environment. Fluorinated hydrocarbon polymer, for example, TEFLON brand plastic, is a preferred material for those components exposed to the fluid product when the fluid product is highly reactive and when dispensing speeds are moderately high.

Other and further features, objects, advantages, and benefits of the invention will become apparent from the following description taken in conjunction with the following drawings. It is to be understood that both the foregoing general description and the following detailed description are exemplary and explanatory but are not restrictive of the invention. The accompanying drawings, which are incorporated in and constitute a part of this invention, illustrate some of the embodiments of the invention and, together with the description, serve to explain the principles of the invention in general terms. Like numerals refer to like parts throughout.

DESCRIPTION OF THE PREFERRED EMBODIMENTS

Figure 1:
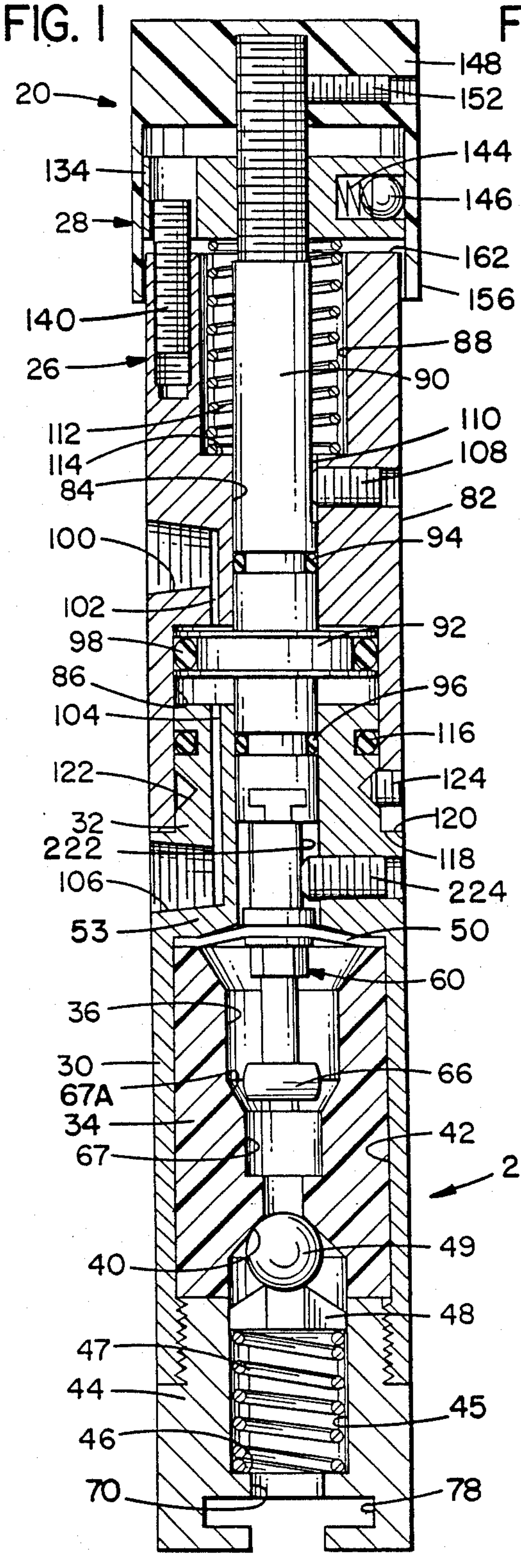
FIG. 1 is a front elevation view, largely cut away and in section, of modular dispensing apparatus embodying the invention.
Figure 2:
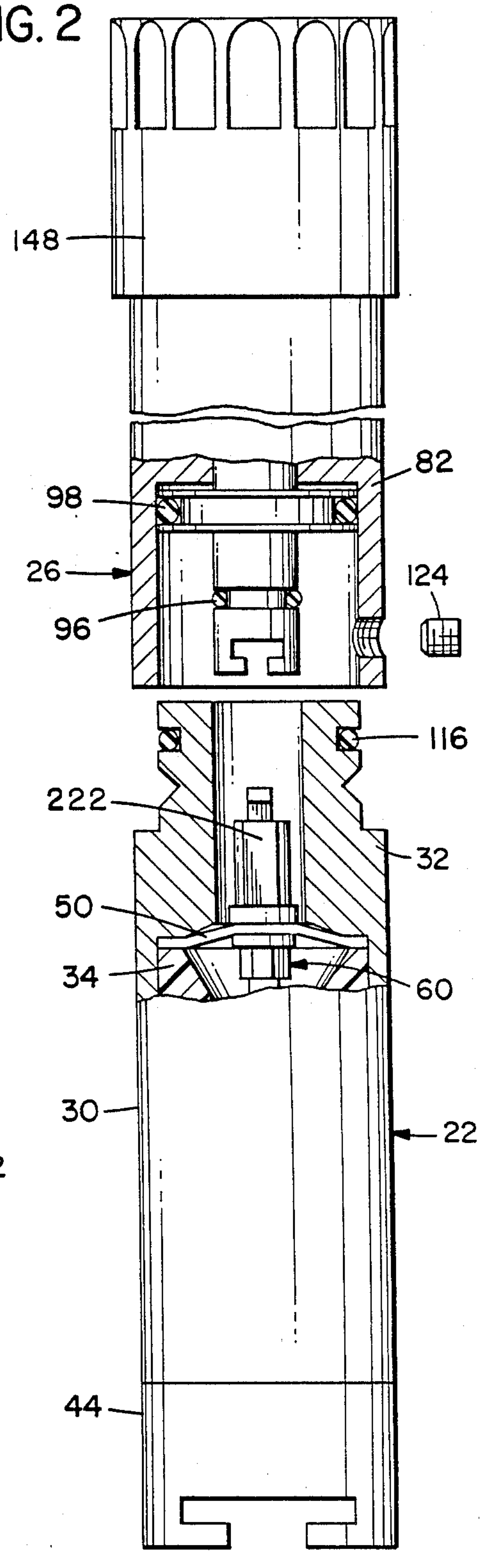
FIG. 2 is a front elevation view, generally similar to FIG. 1, of the apparatus partly exploded and partly cut away and in section.
Figure 3:
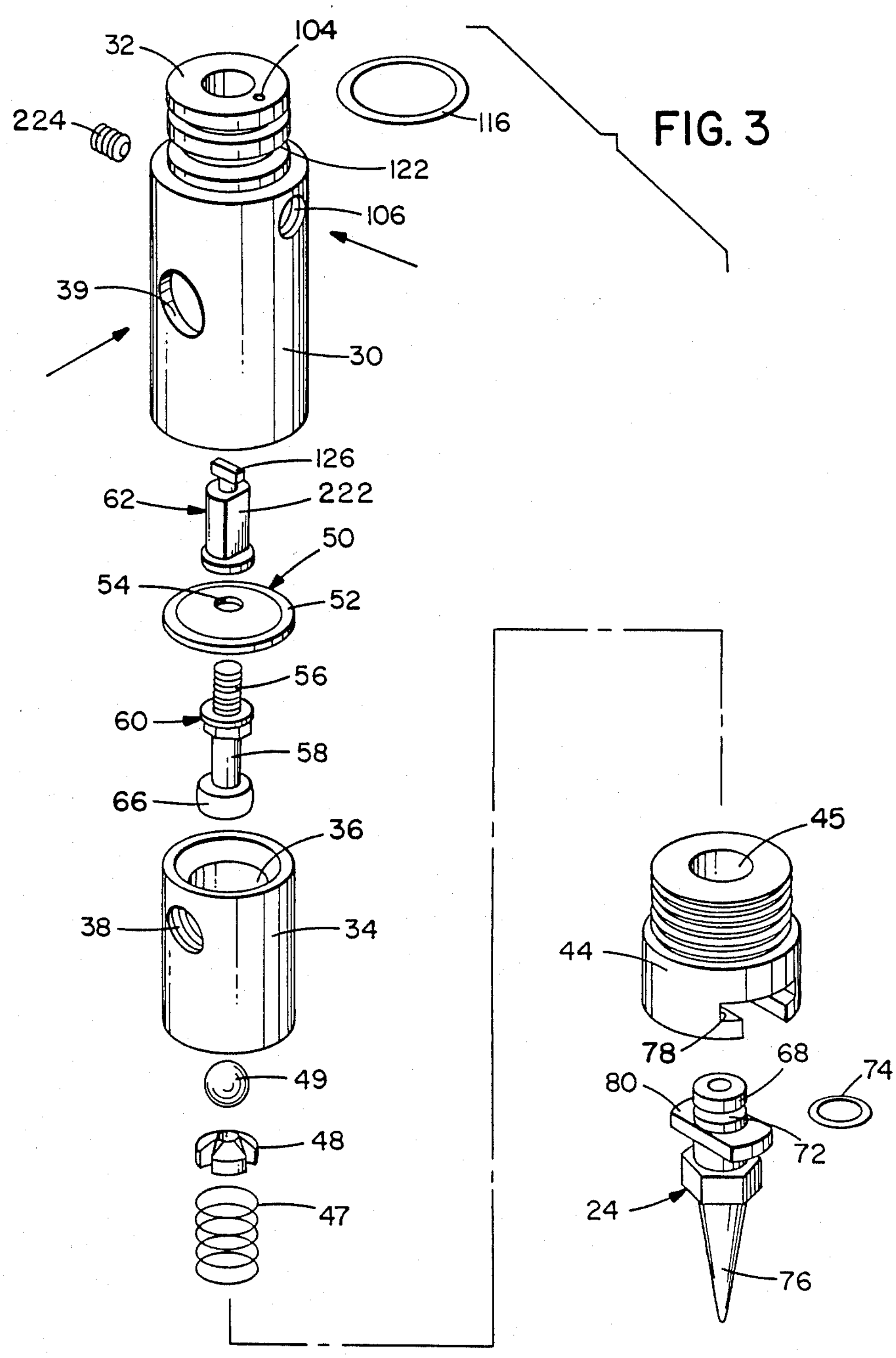
FIG. 3 is an exploded view of dispensing and nozzle units comprising part of the apparatus illustrated in FIG. 1.

Turn now to the drawings and, initially, to FIGS. 1–3, which illustrate modular positive displacement dispensing apparatus 20 embodying the present invention. The apparatus 20 comprises a dispensing unit 22, a nozzle unit 24, an actuator unit 26, and an adjustment unit 28. Each of these units will be described in detail together with an explanation of their interrelationship.

The description will begin with the dispensing unit 22 which includes a cylindrical housing 30 with an end member 32 of reduced diameter. While the housing 30 is described and illustrated as being cylindrical and thereby conforms with all of the other units illustrated in FIGS. 1 and 2, such shape, while preferred, is not intended to be limiting of the invention. An insert 34 is fittingly receivable within the housing 30. The insert 34 defines a reservoir 36 capable of receiving pressurized product from a distant source (not shown) via an inlet 38 in the housing 30 and an aligned inlet 39 in the insert (FIG. 3). The insert 34 is formed at its lower end, viewing FIG. 1, with a conical closure surface 40, and is preferably composed of a suitable material compatible with a fluid product to be dispensed. Suitable materials include, but are not limited to, DELRIN brand plastic, polyethylene, polypropylene, nylon, polyester, metals including stainless steel and preferably 316 stainless steel, ceramics, and most preferably fluorinated hydrocarbon polymer, for example, TEFLON brand plastic. The insert 34 is fittingly received in a counterbore 42 formed at the lowermost end (FIG. 1) end of the housing 30. It will be appreciated that the housing 30 and insert 34 may be of one piece construction and that they are only described as being separate for ease of fabrication.

The extreme end of the housing 30 opposite the end member 32 is internally threaded so as to receive a cap member 44. The cap member 44 (FIG. 1) has an internal bore 45 with a shoulder 46 therein. A compression spring 47 is received in the bore 45 and at one end engages the shoulder 46. At its opposite end, the spring 47 engages a suitable retainer 48 which, in turn, supports a gate member, preferably in the form of all 49, and holds it normally in engagement with the closure surface 40. When the cap member 44 is tightened onto the housing 30, the shoulder 46, spring 47, and retainer 48 all cooperate to firmly hold the ball 49 seated on the closure surface 40.

A deformable diaphragm 50 which may be composed of any suitable deformable material compatible with the fluid product being dispensed extends transversely of a longitudinal axis of the housing 30. Such suitable materials may be any of those materials recited above with respect to the valve seat, with the exception of ceramics. The outer peripheral regions 52 (see FIG. 3) are captured between the insert 34 and a shoulder 53 (FIG. 1) of the housing 30 when the cap member 44 is fully tightened onto the housing. As seen most clearly in FIG. 3, the diaphragm 50 has a central aperture 54 which allows it to freely receive a threaded stud 56 extending from a distal portion 58 of an elongated stem member 60.

A proximal extension 62 of the stem member 60 is threadedly engaged with the stud 56 and when tightened down onto the diaphragm 50, the stem member 60 and the diaphragm 50 operate in a unitary manner. The proximal extension 62 is provided with a longitudinal flat 222 (FIGS. 1 through 3) which serves as a keyway and prevents rotation of the extension which the flat 222 is engaged by a set screw 224 threaded within housing 30. A distal end of the distal portion 58 has a longitudinally extending threaded bore therein to receive a fastener 64 (see especially FIGS. 4-7). The fastener is slidably received through a diametrically extending bore in a product piston 66 which is, in effect, a ball from which has been removed two opposed spherical segments. The piston 66 may be composed of any suitable material compatible with the fluid product being dispensed. Such a suitable material may be any of those materials of which the insert 34 may be composed. When the fastener 64 is tightened onto the distal portion 58 of the stem member 60, the product piston is integral, and operates in unison, with the stem member and its associated diaphragm 50.

The piston 66 may have a slight clearance fit with respect to the wall of the chamber 67 or it may have a slight interference fit. It may even use an o-ring to insure a uniform wiping action with the wall of the chamber 67 as it moves. By reason of the cooperative relationship between the product piston 66 and the wall of the chamber 67 there is no need for a check valve between the supply source and the reservoir 36.

It will be appreciated that the invention is not to be limited to a closure in the form of the conical surface 40 and the ball 49, but may be of any suitable shape that results in a proper closure of the opening between the reservoir 36 and the nozzle unit 24. The conical surface 40 and ball 49 are preferred because they result in substantially a line contact and not an area contact between the mating elements. However, other suitable shapes may be effectively used and still obtain the benefits of the invention.

With continuing reference to FIGS. 1 and 4-7, it is seen that the insert 34 is formed with a chamber 67 intermediate the reservoir 36 and the closure surface 40. The chamber 67 is dimensionally smaller than the reservoir 36. Furthermore, in the constructions illustrated, the chamber is axially aligned with the reservoir 36 such that there is a cone shaped cam surface 67A at the interface between the reservoir 36 and the chamber 67. As will be seen subsequently, the product piston 66 is movable on the stem member 60 between an inactive position within the reservoir 36 withdrawn from the chamber 67 and an active position sealingly, slidably received within the chamber 67.

Figure 4:
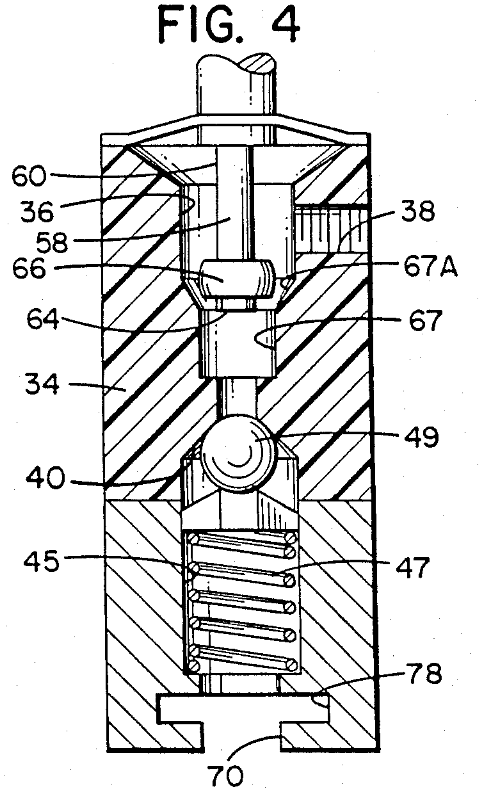
FIGS. 4–7 are elevation views, largely cut away and in section, illustrating the dispensing unit of FIG. 3 in the assembled condition and showing various operational positions thereof.
Figure 5:
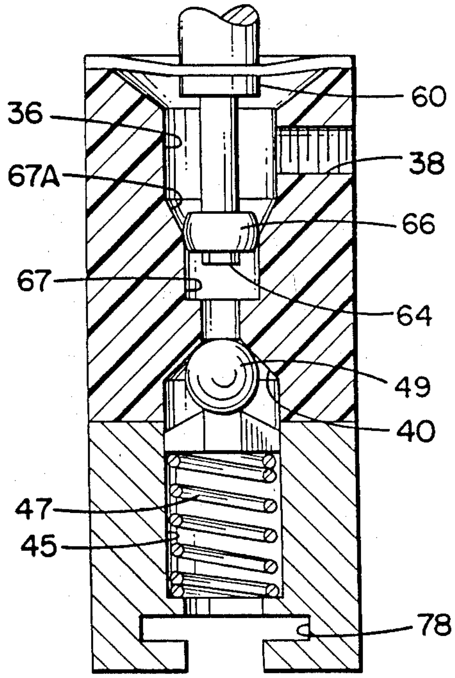
Figure 6:
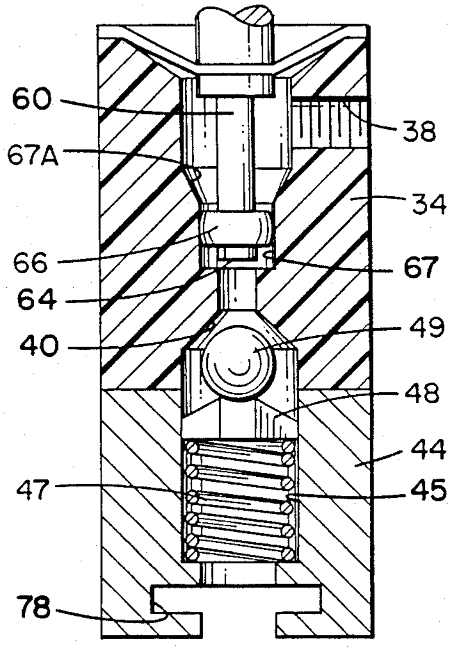

As the stem member 60 moves downwardly, viewing FIG. 4, it reaches a point at which the outer peripheral surface of the product piston 66 engages the wall of the chamber 67. This initial engagement is illustrated in FIG. 5. Since the product within the reservoir 36 is pressurized, the product being dispensed will also have completely filled the chamber 67. With continued downward movement of the stem member 60, the product piston 66 moves with the stem member, and its outer peripheral surface initially engages the wall of the chamber 67 as illustrated in FIG. 5. With continued downward movement of the stem member 60, the product piston 66 moves to an active position well within the chamber 67 which represents its farthest movement of this particular stroke. Such a position is illustrated in FIG. 6. When the product piston moves from the FIG. 5 position to the FIG. 6 position, the product being thereby advanced forces the ball 49 off the closure surface 40. The amount of the product displaced as the product piston 66 moves from the FIG. 5 position to the FIG. 6 position is referred to as a "defined charge" of the product. When the stem member 60, and with it the product piston 66, reaches the end of its downward stroke and the defined charge is expelled, the ball 49 returns into engagement with the closure surface 40 under the bias of the spring 47 (FIG. 1), as discussed in detail below.

Figure 7:
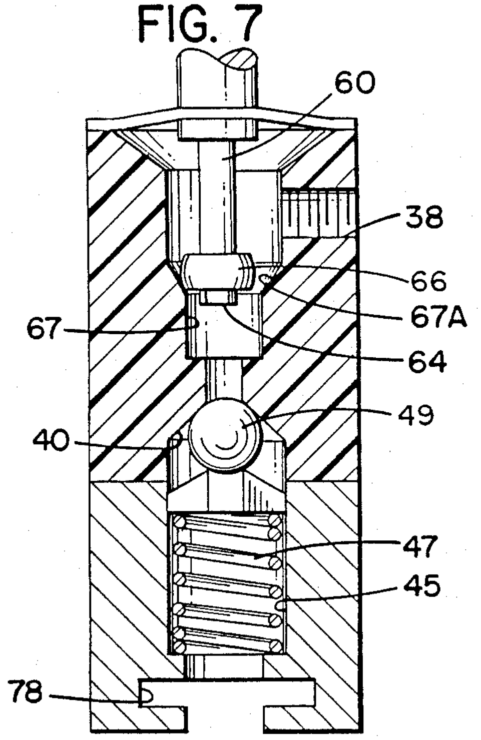

A particular feature of the invention resides in the construction of the stem member 60 and product piston 66 and their relationship with the chamber 67. Specifically, the construction of the invention compensates for any misalignment that there may be in the various components and permits the apparatus 20 to operate in a completely satisfactory manner nonetheless. Thus, the stem member 60 is designed to be flexible in directions transverse of its longitudinal axis. With that construction and a contoured outer surface of the product piston 66 as illustrated, in the event the components are misaligned as is indicated in FIG. 7, the outer peripheral surface of the product piston 66 is caused to engage the cam surface 67A which serves to guide the piston therealong until it reaches the FIG. 5 position and is fully centered so as to proceed to the FIG. 6 position. Thus, the cam surface 67A and the outer surface of the product piston 66 are mutually effective to guide the piston into sliding sealing engagement with the inner wall of the chamber 67 even when the longitudinal axis of the stem member is misaligned relative to the longitudinal axis of the insert 34.

Turning now to FIG. 3, the nozzle unit 24 includes a mounting end 68 which extends through a longitudinal bore 70 formed in the cap member 44. An annular groove 72 formed a short distance away from an innermost end of the nozzle unit 24 serves to receive an o-ring seal 74 which assures passage of product, in a manner to be explained, through a hollow needle member 76. The cap member 44 is formed with a diametrically extending slot 78 whose purpose is to receivably engage oppositely extending bayonet type extensions 80 integral with the nozzle unit 24. By reason of this construction, the dispensing unit 22 can accommodate, one at a time, a variety of sizes of nozzle units 24. A nozzle unit can be removed by twisting it slightly around its longitudinal axis, then pulling it outward of the bore 70. A new or different nozzle unit 24 can then be attached by reversing the operation just described.

Figure 8:
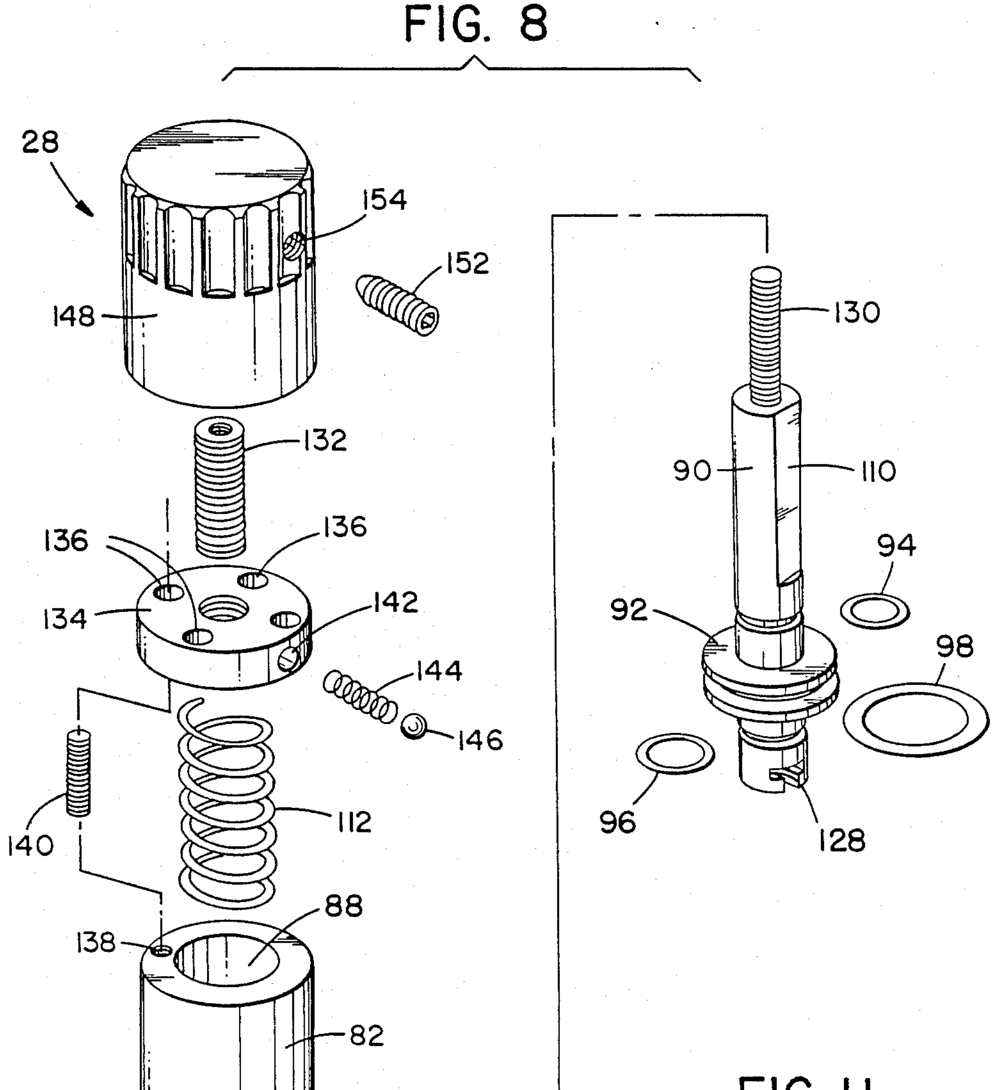
FIG. 8 is an exploded view of actuator and adjustment units comprising part of the apparatus illustrated in FIG. 1.
Figure 11:
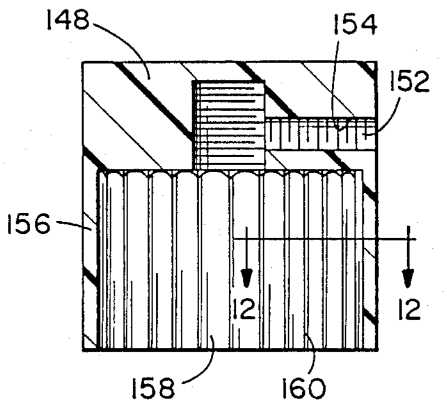
FIG. 11 is an elevational cross section view of one component illustrated in FIGS. 8–10.
Figure 9:
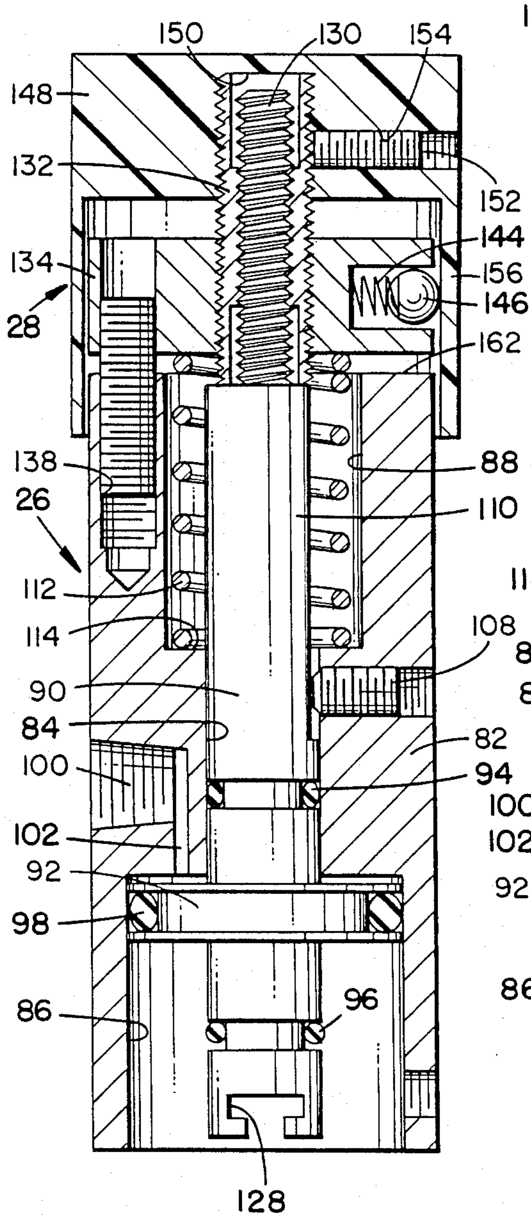
FIGS. 9 and 10 are elevation views, in section, illustrating the actuator and adjustment units of FIG. 8 in the assembled condition and showing, respectively, two operational positions of the adjustment unit.
Figure 10:
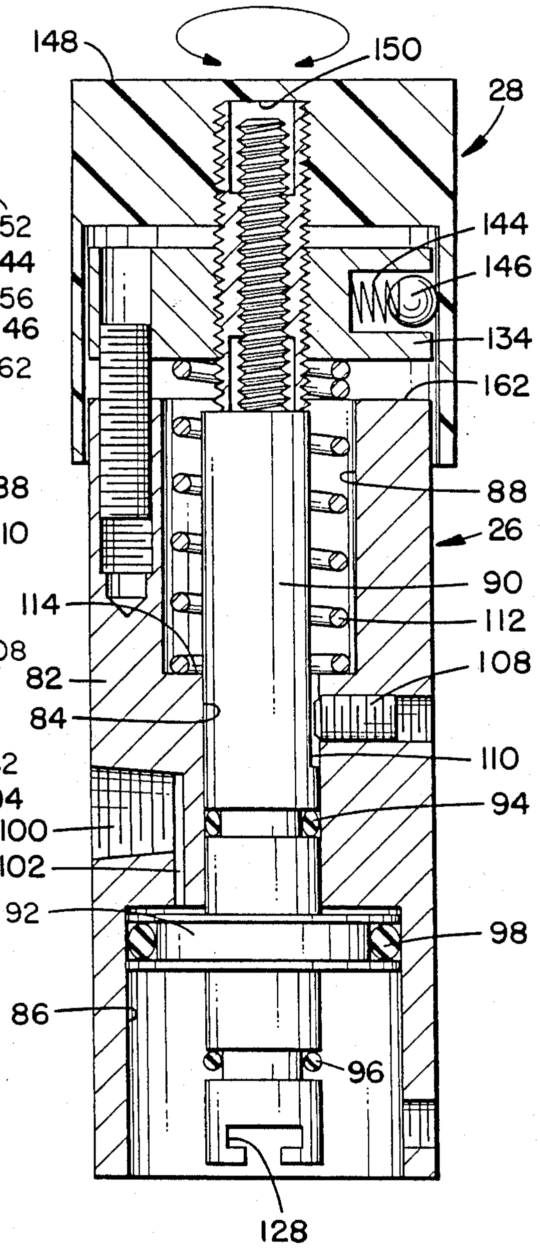
Figure 12:
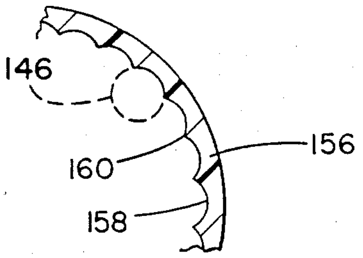
FIG. 12 is a detail cross section view taken generally along line 12—12 in FIG. 11.

The actuator unit 26, also as seen in FIGS. 1 and 2, and with more detail in FIGS. 8–10, includes an elongated cylinder 82 with a longitudinally extending central bore 84 formed in its intermediate regions, a distal counterbore 86, and a proximal counterbore 88. Both counterbores 86 and 88 communicate with and are axially aligned relative to the central bore 84. An actuator shaft 90 is slidingly received in the central bore 84 and is integral with a drive piston 92 which is disposed within the counterbore 86. The piston 92, and with it actuator shaft 90, is reciprocable along an actuating axis which is the longitudinal axis of the cylinder 82. The piston 92 may be fluid operated, preferably pneumatic, although other fluids, including liquids, could be utilized. Indeed, it will be appreciated that the actuator unit 26 could be of a completely different type, for example, an electrically operated solenoid, or a mechanical cam. Also, operation of the actuator unit 26 may be under the control of an appropriate computer (not shown). However, in the instance of the actuator unit 26, o-ring seals 94 and 96 encircle the actuator shaft 90 at locations spaced in opposite directions from the piston 92. The piston 92 itself is also provided with a suitable o-ring seal 98.

Thus, viewing FIG. 1, in order to move the piston 92 downwardly, pressurized actuating fluid is introduced to an inlet 100 whereupon it is caused to flow via a conduit 102 into the counterbore 86 above the piston. Any actuating fluid within the counterbore 86 beneath the piston 92 is then exhausted via a conduit 104 within the end member 32 and an outlet 106 therein with which it communicates. The actuator shaft 90 is prevented from rotating by means of a set screw 108 threadedly engaged with the cylinder 82 and radially disposed therein having an extremity which is positioned proximate to a longitudinal flat 110 (FIG. 8) formed in the shaft which serves as a keyway. A compression spring 112 is received in the counterbore 88 and one end rests on a supporting surface 114 thereof. In a manner which will be described subseqently, the compression spring 112, redundantly, serves to retain the piston 92 in the retracted position illustrated in FIG. 1 when it is in the inactive condition. That is, air or other actuating fluid is normally used to move the piston 92 to the inactive position, but the spring 112 is an added expedient for doing so in the event of a loss of actuating fluid.

In a manner which will now be described, the piston 92 serves to operate the valve mechanism as most specifically represented by the ball 49 operating in conjunction with the closure surface 40. With continuing reference to FIG. 1, the end member 32 of the dispensing unit 22 is slidably received within the distal counterbore 86 of the actuating unit 26. An o-ring seal 116 suitably encircles the end member 32 short of its proximal end to assure a sealing relationship between the cylinder 82 and the end member 32. When an extreme distal rim 118 of the cylinder 82 firmly engages a shoulder 120 of the housing 30, an annular groove 122 formed in the outer surface of the end member 32 is aligned with a plurality of circumferentially spaced set screws 124 threadedly engaged with the cylinder 82 and extending radially therethrough. By reason of the construction just described, it will be appreciated that the dispensing unit 22 can be selectively attached to or removed from the actuator unit 26 and, further that when the respective units are so joined, they can be prevented from separation by tightening the set screws 124 into engagement with the annular groove 122.

It is also noted that the extreme end of the extension 62 is formed with a male T-connector 126 (FIG. 3) which is engageable with a similarly formed female slot 128 (FIG. 8) in the distal end of the shaft 90. As the dispensing unit 22 is inserted into the actuator unit 26 (see especially FIG. 2), the former is aligned so that the T-connector 126 is properly received by the slot 128. Thereupon, the dispensing unit 22 is rotated 90° so that the T-connector 126 is properly oriented to prevent withdrawal of the stem member 60 from the actuator shaft 90. When this occurs, the stem member and the shaft are operable as a unit when they are moved along a longitudinal axis of the apparatus 20. Customarily, the set screws 124 would not be adjusted to engage the annular groove 122 until the T-connector 126 had been fully engaged with the slot 128.

With reference now particularly to FIGS. 8–12, the adjustment unit 28 will now be described. The adjustment unit 28 serves to selectively adjust operation of the drive piston 92 so that it moves the product piston 66 to any one of a plurality of active positions from the inactive or withdrawn position. In any of the active positions, the product piston 66 is sealingly, slidably received within the chamber 67. This concept will be explained in detail as the description proceeds. As seen particularly well in FIGS. 8-10, a threaded shank 130 is integral with and extends from a proximal end of the actuator shaft 90, that is, from an end distant from the piston 92. An internally threaded tubular stud 132 is threadedly engaged with the threaded shank 130. The stud 132 is also externally threaded, the external threads being coarser than the internal threads. A stroke adjuster nut 134 is threadedly received on the stud 132 and is keyed to the cylinder 82 for non-rotational, axial movement along the longitudinal or actuating axis of the apparatus 20. This key construction will now be described. As seen particularly well in FIG. 8, the stroke adjuster nut 134 is formed with four bores 136 which are parallel to a longitudinal axis of the cylinder 82 and equally spaced circumferentially of the nut 134. The cylinder 82 is formed with a threaded bore 138 adapted to receive a threaded stud 140. The axis of the bore 138 is at the same radial distance from the longitudinal axis of the cylinder 82 as each of the bores 136. In any event, the stroke adjuster nut 134 is properly positioned on the stud 132. Then one of the holes 136 is aligned with the threaded bore 138, whereupon the stud 140 is received through the bore 136 and threadedly engaged with the bore 138. In this manner, the nut 134 is held against rotation relative to the cylinder 82, although it has feedom of axial movement relative to the cylinder 82.

The nut 134 is also formed with a radially directed bore 142 which, together with a compression spring 144 and a ball 146 having a diameter just slightly less than the bore 142, operates as a detent in a manner which will be described shortly (FIG. 8). With the spring 144 and the ball 146 held within the radial bore 142, a crown member 148 is threadedly engaged with the stud 132. The stud extends all the way to the bottom of a threaded bore 150 of the crown member 148. A set screw 152 (FIG. 9) is threadedly engaged with a radially directed bore 154 in the crown member, then advanced, until it engages the stud 132. With the set screw 152 thereby engaging the stud 32, the crown member 148 and the stud 132 operate as a unit.

Integral with the crown member 148 is an annular skirt 156 which overlies the outer surface of the cylinder 82. As seen particularly well in FIGS. 11 and 12, the inner peripheral surface of the skirt 156 is formed with a plurality of parallel, side-by-side, longitudinally extending grooves 158, each groove having approximately the same radius of curvature as the ball 146. Indeed, the ball 146 engages one of the grooves 158 at a time. By reason of the resiliency of the spring 144, the crown member 148 can be rotated about its longitudinal axis, causing the ball 146 to ride over a ridge 160 (FIGS. 11 and 12) intermediate adjoining grooves 158 until it comes to rest in the next groove, and so forth. There is a fixed relationship between the rotation of the crown member about the actuating axis and movement of the adjuster nut 134 along the actuating axis. The apparatus 20 might be designed, for example, such that the adjuster nut 134 advances toward or retracts from a terminal surface 162 of the cylinder 82 at the rate of 1/1000th of an inch per click, that is, movement of the ball 146 from one groove 158 to its adjoining groove.

Although FIGS. 1-7 have consistently illustrated one form and construction of the diaphragm 50, it need not be so limited but may be of a variety of shapes and constructions. However, in each instance the outer peripheral region of the diaphragm is held fixed while the central region is movable in a direction transverse to a general plane of the diaphragm.

Figure 13:
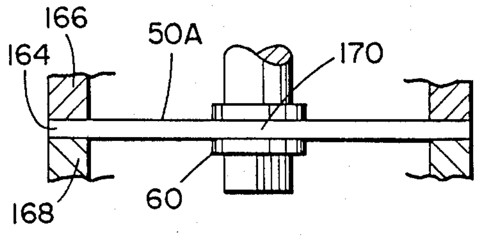
FIGS. 13–18 are detail elevation views, partly in section, illustrating other embodiments of a diaphragm construction which can be utilized by the invention.
Figure 14:
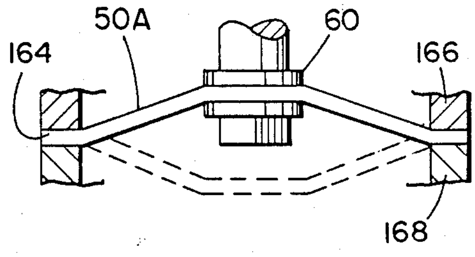

For example, in FIG. 13, a modified diaphragm 50A is illustrated having its outer peripheral region 164 firmly held between suitable retention members 166, 168. While the stem member 60 fixed to a central region 170 of the diaphragm 50A is free to move in a longitudinal direction, it is subject to the degree of elasticity present in the diaphragm in directions transverse to a plane of the diaphragm. Extreme positions of the diaphragm 50A are illustrated in FIG. 14.

Figure 15:
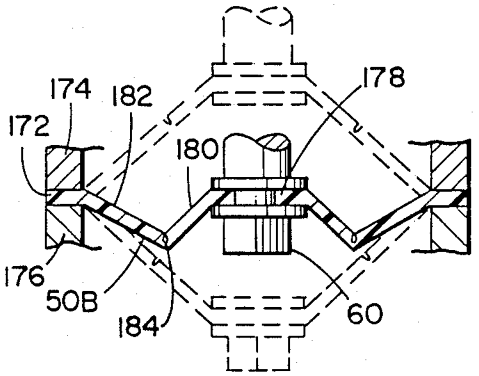
Figure 16:
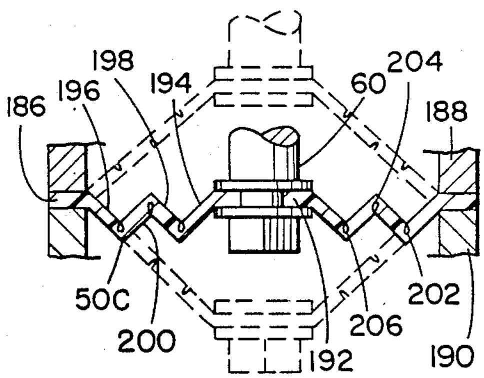

Greater transverse movement can be achieved with the constructions illustrated in FIGS. 15 and 16. With respect to FIG. 15, another modified diaphragm 50B has its outer peripheral region 172 fixedly held by retention members 174, 176 while its central region 178 is fixed to the stem member 60. The diaphragm 50B, which is illustrated in FIG. 15 in its relaxed condition, includes a first fold member 180 adjacent the central region 178 and a second fold member 182 adjacent the outer peripheral region 172. The fold members 180 and 182 intersect at an annular apex which is of a living hinge construction. As seen in FIG. 15, the apex 184 lies outer of the plane of the central region 178 and outer peripheral region 172 when the diaphragm 50B assumes its solid line position (FIG. 15) When the stem member 60 is moved along its longitudinal axis, it will be seen that the diaphragm can take either of the two extreme positions illustrated in FIG. 15 by means of dotted lines. It will be appreciated that the displacement from the norm obtainable with the diaphragm 50B is substantially greater than that obtainable with either the diaphragm 50 or 50A.

A variation on the construction of the diaphragm 50B is illustrated in FIG. 16 in which another modified diaphragm 50C is illustrated. In this instance, the diaphragm has an outer peripheral region 186 which is fixed between suitable retention members 188, 190 and a central region 192 which is fixed to the stem member 60. In this instance, a plurality of concentric fold members 194, 196 cooperate with a like plurality of fold members 198, 200. Each adjoining pair of fold members defines an annular apex 202, 204, and 206, respectively, each of which is a living hinge. Upon actuation of the stem member 60, the diaphragm 50C can be moved to the extreme positions indicated by dotted lines in FIG. 16 in which all of the fold members are movable toward a generally mutually coplanar relationship.

Figure 17:
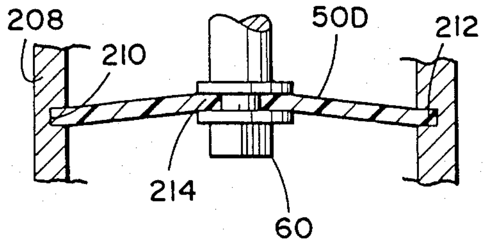

Still another construction is illustrated in FIG. 17 in which an outer cylindrical retention member 208 which may be a housing itself or an insert within that housing is formed with an internal annular slot 210 therein. The slot 210 is capable of receiving and holding an outer peripheral region 212 of another modified diaphragn 50D whose central region 214 is fixed to the stem member 60.

Figure 18:
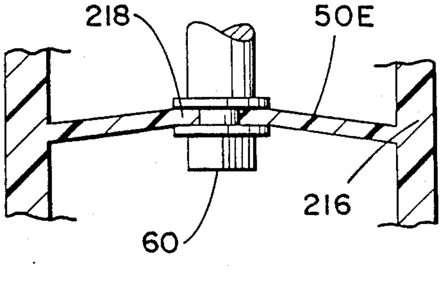

Yet another construction is illustrated in FIG. 18 in which an outer retainer 216 and a modified diaphragm 50E are integral. The components may be fabricated, for example, of an injection molded plastic material. An outer peripheral region of the diaphragm 50E, in this construction, is integral with the retainer 216 but, again, it has a central region 218 which is fixed to the stem member 60. As in the previously described constructions, the stem member is movable along its longitudinal axis within defined limits depending upon the degree of elasticity present in the diaphragm.

OPERATION

The operation of the modular dispensing apparatus 20 will now be described. The particular fluid to be dispensed, which may be, for example, a sealant or adhesive material in the form of a slurry, or otherwise, is introduced, under pressure, via inlets 38 and 39 so as to fill the reservoir 36 and the chamber 67. At an appropriate time, the actuator unit 26 is operated to dispense the product from the dispensing unit 22. Viewing FIG. 1, this is achieved by introducing pressurized fluid, air for example, via the inlet 100 to the upper side of the piston 92. This moves the actuator shaft 90 downwardly and, with it, the stem member 60. This causes the diaphragm 50 to move from the position illustrated in FIG. 4 to that illustrated in FIG. 5 and, simultaneously, moves the product piston 66 into sliding, sealing engagement with the wall of the chamber 67, thereby isolating the chamber from the reservoir 36 while the ball 49 remains seated on the closure surface 40 as seen in FIG. 5.

The movement of the piston 92 and of the actuator shaft 90 is against the bias of the spring 112. Furthermore, the stroke of the piston 92 is determined by the distance between the adjuster nut 134 and the terminal surface 162. FIG. 9 illustrates a positioning of the adjuster nut 134 relative to the terminal surface 162 which will permit only a relatively small stroke by the piston and FIG. 10 illustrates such a relative positioning as will permit a relatively long stroke for the piston. Thus, in the former instance, a relatively small defined charge of the product will be dispensed while in the latter instance a relatively large defined charge will be dispensed.

Of course, it is the stroke of the piston 92, as permitted by the adjuster nut 134, which determines the extent of the movement of the product piston 66 into the chamber 67. As the product piston 66 moves into the chamber 67 to the FIG. 6 position, the product within the chamber forces the ball 49 off the closure surface 40, thereby releasing a defined change of the product from the chamber. The farther the product piston 66 travels into the chamber 67, the greater is the amount of product dispensed by the dispensing unit 22. The product then flows through the retainer 48, then through the needle member 76 of the nozzle unit 24 and onto a surface intended to receive the product. When the defined charge has been dispensed from the chamber 67, the flow of fluid through inlet 100 is caused to terminate and the spring 112, alone or preferably in conjunction with the flow of fluid in outlet 106 through conduit 140 into the counterbore 86 beneath the piston 92, is operative to return the drive piston 92 to its rest position and simultaneously return the product piston 66 to its inactive position as seen in FIG. 4.

It was previously explained that in the event of a misalignment between the stem member 60 and the chamber 67 (FIG. 7), as the stem member is caused to advance by the actuator shaft 90, the product piston 66 engages the cone shaped cam surface 67A. By reason of the longitudinal resiliency designed into the stem member 60, and with the guidance of the cam surface 67A, the product piston 66 is aligned so as to sealingly, slidably engage the wall of the chamber 67 as seen in FIGS. 5 and 6.

The apparatus 20 is of a modular design in that it permits various combinations of actuator units 26, diaphragms, dispensing units 22, and nozzle units 24. The dispenser of the invention is considered sealless because the dispensing unit 22 completely lacks the sliding seals of the type which have heretofore customarily been employed in fluid dispensing apparatus and which typically fail in their operation when the seals fail. In this instance, the diaphragm 50 is the sole component utilized to isolate the actuator unit 26 from the dispensing unit 22. While axial movement is permitted by reason of the deformability of the diaphragm, it is held fixed at both its interior locations and its outer peripheral locations to prevent any possibility of the product passing from the reservoir 36 into the mechanism of the actuator unit. Wear and frictional loses and loss of product are avoided by reason of this construction.

While it is acknowledged that there are other dynamic seals in the apparatus 20, for example, o-ring seals 94, 96, 98, and 116, these are seals within the actuator unit 26 and not directly involved with, or concerned with, the product being dispensed. The o-ring seal 74 (FIG. 3) is associated with the nozzle unit 24 and, therefore, also not directly with the dispensing unit 22. In any event, its condition is easily observable and it can be readily removed along with the nozzle unit and replaced if it becomes defective. Furthermore, it is not a dynamic, or sliding type seal, which is the type of seal with which the invention is concerned and serves to replace.

While preferred embodiments of the invention have been disclosed in detail, it should be understood by those skilled in the art that various modifications may be made to the illustrated embodiments without departing from the spirit and scope thereof as described in the specification and defined in the appended claims.

What is claimed is:

1. Positive displacement pump apparatus for dispensing precise quantities of a fluid product comprising:

a housing defining a fluid product reservoir and having an inlet for delivery of pressurized fluid product to said reservoir and including a closure surface defining an outlet for dispensing the fluid product from said reservoir;

a chamber intermediate said reservoir and said closure surface for receiving fluid product from said reservoir and for dispensing fluid product through the outlet in said closure surface closure means normally biased to a closed position in engagement with said closure surface;

actuator means including an operation mechanism and an actuator shaft member extending away from said operative mechanism a stem member coaxially with and mounted on said actuator shaft member;

a product piston mounted to an extremity of said stem member, distant from said operative mechanism, and movable between an inactive position within said reservoir withdrawn from said chamber and an active position sealingly, slidably received within said chamber to move said closure means, by means of the fluid product within said chamber, to an open position and thereby dispense the fluid product from said chamber; and sealless sealing means fixed to said housing and to said stem member and extending therebetween for isolating said reservoir from said operative mechanism, said sealing means being deformable to permit movement of said product piston between said inactive and active positions.

2. Positive displacement pump apparatus as set forth in claim 1 wherein said closure means includes:

a check ball; and a spring biasing said check ball into sealing engagement with said closure surface.

3. Positive displacement pump apparatus as set forth in claim 1 wherein said housing has a longitudinal axis along which said chamber and said closure surface are centrally disposed, said stem member being movable along said longitudinal axis; and wherein said seallness sealing means is a deformable diaphragm extending transversely of said actuating axis fixed at spaced regions, respectively, to said housing and to said stem member.

4. Positive displacement pump apparatus as set forth in claim 3 wherein said diaphragm is fixed to said stem member intermediate said operative mechanism and said product piston.

5. Positive displacement pump apparatus as set forth in claim 4 wherein said diaphragm has a central region fixed to said stem member and an outer peripheral region fixed to said housing.

6. Positive displacement pump apparatus as set forth in claim 5 wherein said outer peripheral region is integral with said housing.

7. Positive displacement pump apparatus as set forth in claim 5 wherein said diaphragm is a substantially planar disk.

8. Dispensing apparatus as set forth in claim 5 wherein said diaphragm is selected from the group consisting of:

diaphragms having a generally concave shape;

diaphragms having a first fold member adjacent said central region and a second fold member adjacent said outer peripheral region, said first and second fold members intersecting at an annular apex which, when the central region and peripheral region are in a coplanar relationship, is displaced from said plane in directions parallel to said longitudinal axis, said annular apex being a living hinge such that said first fold member is movable toward a coplanar relationship with said second fold member upon movement of said stem member; and diaphragms having a plurality of concentric fold members, each adjoining pair of fold members defining an annular apex being a living hinge, all of said fold members being movable toward a mutually coplanar relationship upon movement of said stem member from a position in which said peripheral region and said central region of said diaphragm are in a coplanar relationship.

9. Positive displacement pump apparatus as set forth in claim 3 wherein said chamber is shaped as a right cylinder whose inner sidewall is coaxial with said longitudinal axis of said housing; and wherein a longitudinal axis of said stem member is generally substantially aligned with said longitudinal axis of said housing.

10. Positive displacement pump apparatus as set forth in claim 9 wherein said reservoir is generally shaped as a right cylinder whose diameter is greater than that of said chamber; and wherein said housing has a cone-shaped surface intermediate said reservoir and said chamber for guiding said product piston into sliding sealing engagement with said inner sidewall of said chamber as said stem member moves between said inactive position and said active position.

11. Positive displacement pump apparatus as set forth in claim 10 wherein said stem member is flexible in directions transverse of said longitudinal axis of said stem member; and wherein said product piston has a contoured outer surface slidably engageable with said cone-shaped surface through a range of relative angularly disposed positions;

said cone-shaped surface and said outer surface of said product piston being mutually effective to guide said piston into sliding sealing engagement with said inner sidewall of said chamber when the longitudinal axis of said stem member is misaligned relative to said longitudinal axis of said housing.

12. Positive displacement pump apparatus as set forth in claim 11 wherein said product piston is substantially spherical.

13. Dispensing apparatus as set forth in claim 1 wherein said operative mechanism includes a cylinder and a fluid operated drive piston axially movable in said cylinder, along an actuating axis, between first and second positions, said first position coinciding with said product piston being in the inactive position and said second position coinciding with said product piston being in an active position.

14. Dispensing apparatus as set forth in claim 1 including nozzle means mounted to said housing for receiving product from said chamber and for accurately directing the flow of the fluid product from said housing.

15. Dispensing apparatus as set forth in claim 14 wherein said nozzle means includes a hollow needle member and fastener means engageable with said housing for releasably joining said needle member thereto.

16. A positive displacement pump apparatus as set forth in claim 1 wherein said actuator shaft member is attached to said stem member in an end-to-end relationship, intermediate said operative mechanism and said sealless sealing means.

17. The modular system as set forth in claim 1 including an adjustment means for selectively adjusting operation of said actuator means enabling movement of said product piston between the inactive position and any one of a plurality of active positions.

18. Positive displacement pump apparatus as setforth in claim 1 wherein said stem member is integral with said actuator shaft member.

19. Positive displacement pump apparatus as setforth in claim 1 wherein said stem member and said actuator shaft are releasably attached in end to end relationship.

20. Positive displacement pump apparatus as setforth in claim 1 wherein said product piston is releasably attached to said stem member.

21. Apparatus for dispensing precise quantities of a fluid product comprising:

dispensing means including a product piston and a chamber for receiving the fluid product to be dispensed;

actuator means comprising an operative mechanism for moving said product piston from an inactive position withdrawn from said chamber and an active position sealingly, slidably received within said chamber to effect dispensing of the fluid product by positive displacement, and an actuator body; and adjustment means for selectively adjusting operation of said actuator means enabling it to effect movement of said product piston between the inactive position and any one of a plurality of active positions, said adjustment means comprising a threaded shank integral with said operative mechanism, a tubular stud internally threaded and threadedly engaged with said shank, said tubular stud also being externally threaded, a stroke adjuster nut threadedly received on said tubular stud and keyed to said actuator body to prevent relative rotation therebetween about an actuating axis of said actuator body, said adjuster nut being movable along said actuating axis coincidental with the rotation of the tubular stud about the actuating axis to a plurality of positions between and including a first position, relative to actuator body, wherein said operative mechanism is rendered inoperable and said product piston non-movable or wherein said operative mechanism is operable but said product piston is in an inactive position and a second position, distant from the first position, wherein said operative mechanism is operable and said product piston when in the active position has proceeded to its greatest possible depth into said chamber.

22. Apparatus for dispensing precise quantities of a fluid product as set forth in claim 21 wherein said dispensing means includes (i) a housing defining a reservoir for the fluid product and having an inlet for delivery of the fluid product to said reservoir and a closure surface defining an outlet for dispensing the fluid product from said reservoir and (ii) closure means normally biased to a closed postion in engagement with said closure surface; and wherein said chamber is intermediate said reservoir and said closure surface, and said product piston, when in the inactive position withdrawn from the chamber, is within said reservoir.

23. An apparatus for dispensing precise quantities of a fluid product as set forth in claim 22 wherein said product piston is attached to a proximal, as regards said chamber, end of a stem member extending away from said chamber; and wherein said actuator means includes an elongated actuator shaft member extending away from said operative mechanism, said actuator shaft member being attached to a distal end of said stem member in an end-to-end relationship.

24. An apparatus for dispensing precise quantities of a fluid product as set forth in claim 23 wherein said actuator body comprises a cylinder and said operative mechanism comprises an actuator piston means contained within said cylinder, said actuator piston means attached to said elongated actuator shaft member, and operative means for effecting reciprocation of the actuator piston means along an actuating axis.

25. An apparatus for dispensing precise quantities of a fluid product as set forth in claim 24 wherein said actuator piston means is fluid operable.

26. An apparatus for dispensing precise quantities of a fluid product as set forth in claim 24 further comprising resilient means for biasing said actuator piston such that said product piston is in an inactive position.

27. Dispensing apparatus as set forth in claim 23 including:

sealless sealing means fixed to said housing and to said stem member and extending therebetween for isolating said reservoir from said operative mechanism, said sealing means being deformable to permit movement of said product piston means between said inactive and active positions.

28. Dispensing apparatus as set forth in claim 21 wherein said adjustment means includes means for setting in discrete incremental steps each of said plurality of second positions.

29. Dispensing apparatus as set forth in claim 21 including manual means for rotating said stud to thereby move said adjuster nut between said first and second positions.

30. Dispensing apparatus as set forth in claim 21, including manual means for rotating said stud in discrete incremented steps to thereby move said adjuster nut in similar discrete incremental steps between said first and second positions.

31. Dispensing apparatus as set forth in claim 32 wherein said manual means includes:

a crown member fixed to said stud, said crown member including an integral annular skirt overlying said actuator body and having a plurality of longitudinally extending grooves generally parallel to said actuating axis;

a spring biased detent ball mounted in said adjuster nut and successively engageable with each of said grooves;

whereby rotation of said crown member about said actuating axis results in a predetermined movement of said adjuster nut along said actuating axis.

32. Dispensing apparatus as set forth in claim 31 wherein said crown member is threadedly engaged with said stud; and including:

set screw means for fixedly joining said crown member to said stud.

* * * * *